United States Patent
Sano (10) Patent No.: US 8,424,992 B2
(45) Date of Patent: Apr. 23, 2013

(54) RECORDING METHOD, RECORDING APPARATUS AND OPERATION CONTROL PROGRAM

(75) Inventor: Tsuyoshi Sano, Shiojiri (JP)

(73) Assignee: Seiko Epson Corporation (JP)

( * ) Notice: Subject to any disclaimer, the term of this patent is extended or adjusted under 35 U.S.C. 154(b) by 518 days.

(21) Appl. No.: 12/633,198

(22) Filed: Dec. 8, 2009

(65) Prior Publication Data

US 2010/0207987 A1    Aug. 19, 2010

(30) Foreign Application Priority Data

Dec. 8, 2008 (JP) ................................. 2008-311839

(51) Int. Cl.
*B41J 2/205* (2006.01)
(52) U.S. Cl.
USPC ............................................... 347/15; 347/14
(58) Field of Classification Search ............ 347/14, 347/15, 19, 16, 20, 12
See application file for complete search history.

(56) References Cited

U.S. PATENT DOCUMENTS

| | | | | |
|---|---|---|---|---|
| 6,102,537 | A * | 8/2000 | Kato et al. | 347/101 |
| 7,026,368 | B2 * | 4/2006 | Yamada et al. | 522/83 |
| 2001/0020964 | A1 * | 9/2001 | Irihara et al. | 347/43 |
| 2004/0189772 | A1 * | 9/2004 | Arai | 347/102 |
| 2009/0322814 | A1 * | 12/2009 | Sano | 347/12 |

\* cited by examiner

*Primary Examiner* — Manish S Shah
(74) *Attorney, Agent, or Firm* — Harness, Dickey & Pierce, P.L.C.

(57) ABSTRACT

A recording apparatus, a recording method, and an operation control program, which are superior in color stability (gray balance), are capable of achieving an image quality in which dots are inconspicuous, and are capable of providing images in which phenomenon such that color varies from light source to light source is restrained. The recording method for recording an image using a cyan ink, a magenta ink, a yellow ink, a white ink, and a black ink on a recorded medium, including: a first process for receiving the image data and forming the respective dot pattern data using the various types of inks; a second process for forming respective dots on the recorded medium according to respective dot pattern data obtained in the first process, wherein the first process includes forming the color of an achromatic area at least with a white dot and a black dot when the image data has the color of the achromatic area having a lightness not lower than a predetermined value and includes a color expressed by forming a cyan dot, a magenta dot, and a yellow dot simultaneously on the basis of subtractive mixture of color stimuli.

2 Claims, 7 Drawing Sheets

FIG. 5

RECORDING METHOD, RECORDING APPARATUS AND OPERATION CONTROL PROGRAM

BACKGROUND OF THE INVENTION

Field of the Invention

The present invention relates to a recording method, a recording apparatus, and an operation control program for performing a recording process by causing nozzles of a recording head to discharge recording material.

INVENTION OF RELATED ART

Background Art

An ink jet printer configured to print an image including characters, signs, and so on for advertisement or the like on media such as transparent window glasses or films is known.

Even though only an image is printed directly on a transparent medium, neutral colors having a high lightness such as gray other than high density colors such as red, blue, yellow, black, and so on of the image cannot be presented adequately by being hindered by light entering the image through the transparent medium. Therefore, various methods in which an image such as a color image and so on is printed on the transparent medium via a base color layer in an overlapped manner are proposed.

In Patent Document 1, a printer including a subhead for printing images and a subhead for printing the base color layer arranged on the front portion and the rear portion of an ink jet head with respect to an X direction is disclosed. A base color layer is printed on a medium by ink liquid drops ejected from the subhead for printing the base color layer while moving reciprocally in a Y direction above the medium. Subsequently, the medium is fed and moved forward in the X direction and, after the subhead for printing images has reached above the base color layer printed on the medium, an image is printed on the surface of the base color layer in an overlapped manner by ink liquid drops ejected from the subhead for printing images, which is moved reciprocally in the Y direction above the base color layer. According to Patent Document 1, the printer having the structure as described above allows to print the base color layer on the transparent medium and then print an image on the surface of the base color layer in an overlapped manner, and also to print an image on a back surface side of the transparent medium and then print the base color layer on the back surface side of the image printed on the medium in an overlapped manner by using one ink jet head.

Patent Document 2 discloses an ink jet printer including a carriage having a white color head for discharging white ink and process color heads for discharging respective process colors of ink individually mounted thereon. The ink jet printer includes control means for selectively controlling whether to perform a front printing by discharging ink from at least one of the respective process color heads after having discharged ink from the white color head, or to perform a back printing from the white color head after having discharged ink from at least one of the process color heads is provided. In other words, in the front printing, the side of the process color image is set as the side to be observed, and in the back printing, the side of the transparent film, being used as a recorded medium, is set as the side to be observed, so that an image having a white layer as the base color layer can be formed.

In contrast, there is an ink jet printer for performing double-sided printing. For example, in Patent Document 3 there is description that temperature sensing means provided near a head, which is mounted substantially normally on an ink jet printer for controlling ink discharge, is used to recognize a temperature detected by this temperature sensing means under predetermined conditions as an environmental temperature, and standby time after having ended a first printing surface is varied according to the environmental temperature to secure necessary required ink fixation time and, subsequently, printing on a second printing surface is started. After having recorded on the front surface and making the recording medium wait for a predetermined time, the ink jet printer starts reverse feeding of the recording medium. Then, the recording medium is guided by a switching member and transported along a loop shaped inversion path in an inverting mechanism, and then is fed to a recording unit again in a state of being inverted inside out and front side back for printing on the back side.

Incidentally, a recording apparatus such as an ink jet printer and so on configured to record an image by forming dots on a recording medium, is widely used as an output apparatus for images created by a computer or images shot by a digital camera, etc. In the recording apparatus in this configuration, a color image is reproduced on the basis of so-called the principle of a subtractive mixture of color stimuli by forming cyan dots, magenta dots, and yellow dots at an adequate ratio.

In the principle of the subtractive mixture of color stimuli, black color is reproduced by mixing the cyan dots, the magenta dots, and the yellow dots in equal proportions. However, since actual reproduction of the black color using the cyan dots, the magenta dots, and the yellow dots suffers from instability in color and variations in color, and in order to prevent the total density of dots from exceeding a tolerance in an area where the cyan dots, the magenta dots, and the yellow dots are formed at high densities, replacement of part of these dots with black dots is generally performed.

Here, "instability in color" represents a phenomenon that difference in color is caused when the size of discharged ink drops varies due to the variations in nozzles which discharge ink drops or due to the difference in nozzle temperature or physical property of ink such as viscosity. For example, if the size of cyan ink drops is larger in an area where the black color is expressed by forming the cyan dots, the magenta dots, and the yellow dots, the color becomes a bluish color instead of becoming a complete achromatic color.

Patent Document 4 discloses a printing method for printing an image while forming a plurality of types of cyan dots differentiated in gradation value to be expressed by forming with cyan inks different in density, a plurality of types of magenta dots differentiated in gradation value to be expressed by forming with magenta inks different in density, yellow dots formed with the yellow ink, and a plurality of types of achromatic color dots differentiated in gradation value to be expressed by forming with achromatic color inks different in density on a printing medium, characterized in that in an area where lightness formed especially by light cyan dots, light magenta dots and yellow dots becomes a predetermined value or higher, an image is printed in a state in which dots which express achromatic color from the light cyan dots, the light magenta dots and the yellow dots are replaced totally with light gray dots. Since the gray dots can be reproduced only with the black ink by adjusting the black dot size or the density of the black dots, the light gray dots are reproduced using black inks being different in density, that is, the black ink (K), gray ink (LK) having a lower density than the black ink, and light gray ink (LLK) having lower density than the gray ink in Cited Reference 4. In cited reference 4, there is a description that a high quality image in which dots are inconspicuous in a light image area, and which is not subject to difference in vision depending on the light source is obtained with the configuration as described above.

However, when reproducing the gray dots by the black dots as in Patent Document 4, there is a problem that the black dots are inferior in terms of graininess (dots are likely to be conspicuous), and hence further improvement of the image quality has been desired.

[Patent Document 1] Japanese Unexamined Patent Application Publication No. 2007-50555
[Patent Document 2] Japanese Unexamined Patent Application Publication No. 2003-285427
[Patent Document 3] Japanese Unexamined Patent Application Publication No. 2007-152736
[Patent Document 4] Japanese Unexamined Patent Application Publication No. 2005-22205

SUMMARY OF INVENTION

Problems to be Solved by the Invention

In order to solve the problem as described above, it is an object of the present invention to provide a recording apparatus, a recording method, and an operation control program which are superior in color stability (gray balance), are capable of achieving an image quality in which dots are inconspicuous, and are capable of providing images in which a phenomenon such that color varies from light source to light source is restrained.

Means for Solving the Problems

A recording method according to the present invention is a recording method for recording an image using a cyan ink, a magenta ink, a yellow ink, a white ink, and a black ink on a recorded medium, including:

a first process for receiving the image data and forming respective dot pattern data using the various types of inks; and a second process for forming respective dots on the recorded medium according to the respective dot pattern data obtained in the first process, wherein the first process includes forming the color of an achromatic area at least with a white dot and a black dot when the image data has the color of the achromatic area having a lightness not lower than a predetermined value and includes a color expressed by forming a cyan dot, a magenta dot, and a yellow dot simultaneously on the basis of subtractive mixture of color stimuli (Claim 1).

According to the configuration described above, the color of the gray area is reproduced at least with the white dot and the black dot when the image data has the color of the achromatic area having the lightness not lower than a predetermined value and includes a color expressed by forming the cyan dot, the magenta dot, and the yellow dot simultaneously (that is, colors in a gray area other than white and black) on the basis of subtractive mixture of color stimuli. In this configuration, the color stability is dramatically improved in comparison with reproduction using the cyan dot, the magenta dot, and the yellow dot, and a high-quality image in which dots are prevented from becoming conspicuous can be formed. On the other hand, although the black dots are inferior in terms of graininess (dots are likely to be conspicuous), but have an advantage of having low light source dependency. Therefore, by reproducing gray color with the white dots and the black dots, the image includes the black dots therein, so that a phenomenon of varying in color from light source to light source is restrained.

As regards the term "lightness" here, if the image data is L*a*b* data which is one of the CIE colorimetric system, the L* component is an indicator thereof. Also, when the image data is the RGB data, the gradation values from 0 to 255 are the indicators. Also, the expression "when the image data has the color of the achromatic area having a lightness not lower than a predetermined value and includes a color expressed by forming a cyan dot, a magenta dot, and a yellow dot simultaneously on the basis of subtractive mixture of color stimuli" means a color of the gray area other than white and black and includes not only a case of being achromatic color, but also a case of being a color near the achromatic color such as bluish gray. As long as it is a color which can be expressed by a composite including the cyan dot, the magenta dot, and the yellow dot, this color can be expressed by replacing with a color dot selected from the cyan dot, the magenta dot, and the yellow dot, and a white dot and a black dot. If the color is bluish gray, it can be replaced by the cyan dots, the white dots, and the black dots. If it is an achromatic color, it is expressed only with the white ink and the black ink.

Also, in the recording method described above, the lightness not lower than the predetermined value is preferably greater than or equal to 15 in L* component in CIE colorimetric system (Claim 2).

The term "achromatic color" means a color having only a coordinate of luminance (L component), which indicates monotone gradations from white to black. In the case of black having a low L component, it is not necessary to use the white dot simultaneously because it absorbs other colors, or it can be reproduced only with the black dot. Therefore, the expression "the colors having lightness not lower than the predetermined value" does not include black, and achromatic colors having an L* component not smaller than 15, more preferably, an L* component not lower than 20 and colors near the achromatic colors.

A recording method according to the present invention is a recording method for recording an image by laminating a first image layer and a second image layer in this order on a recorded medium wherein the first image layer is recorded by the recording method according to claim 1 or 2, and the second image layer is a concealing layer for concealing the first image layer, and is recorded over at least part of the first image layer (Claim 3).

Furthermore, the recorded medium is a medium which can be observed from the opposite side of the image formed surface (Claim 5).

According to the configuration as described above, after having recorded the image by the recording method according to claim 1 or 2 described above on the recorded medium (for example, a transparent film) which can be observed from the opposite side of the image formed surface, a concealing image is formed on the image by using an ink which is capable of concealing the image (for example, white ink composition and luminescent ink composition which provides metallic glossiness are exemplified). Therefore, the image having the concealing image as the base layer and having the surface to be observed on the side of the recorded medium can be formed.

A recording method according to the present invention is a recording method for recording an image by laminating a first image layer and a second image layer in this order on a recorded medium wherein:

the first image layer is a concealing layer for concealing at least part of the second image layer from an opposite surface of an image formed surface, the second image layer is recorded by the recording method according to claim 1 or 2 (claim 4).

Furthermore, the recorded medium is a medium which can be observed from the opposite side of the image formed surface (Claim 5).

According to the configuration as described above, before forming the image which corresponds to an uppermost surface (second image layer) on the recorded medium (for example, the transparent film) which can be observed from the opposite side of the image formed surface, the concealing image is firstly formed with an ink which can conceal the image which corresponds to the uppermost surface from the opposite surface of the image formed surface (for example, white ink composition and a luminescent ink composition which provides a metallic glossiness are exemplified). Subsequently, the image which corresponds to the uppermost surface (second image layer) is recorded on the concealing image by the recording method according to claim 1 or 2 described above, so that the image having the concealing image as the base layer and having the surface to be observed on the opposite surface of the recorded medium side (that is, the image formed surface) can be formed.

Also, a recorded object obtained by the recording method described above has dramatically improved color stability, has a high image quality in which dots are inconspicuous, and is restrained from a phenomenon such that color varies from light source to light source.

A recording apparatus according to the present invention is a recording apparatus for recording an image using a cyan ink, a magenta ink, a yellow ink, a white ink, and a black ink on a recorded medium, including: dot pattern data forming means for receiving the image data and forming respective dot pattern data using the various types of inks; dot forming means for forming respective dots on the recorded medium according to the respective dot pattern data obtained by the dot pattern data forming means, wherein the dot pattern data forming means includes forming the color of an achromatic area at least with a white dot and a black dot when the image data has the color of the achromatic area having a lightness not lower than a predetermined value and includes a color expressed by forming a cyan dot, a magenta dot, and a yellow dot simultaneously on the basis of subtractive mixture of color stimuli.

According to the configuration described above, the color of the gray area is reproduced at least with the white dot and the black dot when the image data has the color of the achromatic area having the lightness not lower than a predetermined value and includes a color expressed by forming the cyan dot, the magenta dot, and the yellow dot simultaneously (that is, colors in a gray area other than white and black) on the basis of subtractive mixture of color stimuli. In this configuration, the color stability is dramatically improved in comparison with reproduction using the cyan dot, the magenta dot, and the yellow dot, and a high quality image in which dots are prevented from becoming conspicuous can be formed. On the other hand, although the black dots are inferior in terms of graininess (dots are likely to be conspicuous), but have an advantage of having low light source dependency. Therefore, by reproducing the gray color with the white dots and the black dots, the image includes the black dots therein, so that a phenomenon of varying in color from light source to light source is restrained.

Also, the dot forming means in the recording apparatus according to the present invention includes a plurality of rows of nozzle rows in a primary scanning direction, the nozzle rows each including a plurality of nozzles arranged in a secondary scanning direction, and the plurality of nozzle rows arranged in the primary scanning direction are divided into at least two areas so as to constitute an upstream area and a downstream area with respect to the secondary scanning direction, the nozzle row for discharging the white ink is set in both the upstream area and the downstream area, and the nozzle rows for discharging inks other than the white ink are set in either one of the upstream area and the downstream area (claim 8).

In this configuration, when the nozzle rows for discharging inks other than the white ink are set in the upstream area, ink is first discharged firstly from the nozzle rows existing in the upstream area with respect to the secondary scanning direction (the direction of transport of the recorded medium) and a first layer is formed on the recorded medium which can be observed from the opposite side of the image formed surface. At this time, the nozzle rows existing in the upstream area discharge the cyan ink, the magenta ink, the yellow ink, the whit ink, and the black ink. Subsequently, the second layer is formed on the first layer from the nozzle rows existing in the downstream area with respect to the secondary scanning direction. At this time, the nozzle rows existing in the downstream area discharge only the white ink, and hence a white-color concealing layer is formed as the second layer. In other word, a recorded image (the surface to be observed: the side of the recorded medium) having the white image as a base can be formed by transporting the recording medium once, and the gray area of the image of the first layer is reproduced by the white ink and the black ink, so that the recorded image has dramatically improved color stability, has a high image quality in which dots are inconspicuous, and is restrained from a phenomenon such that color varies from light source to light source.

In contrast, in a case where the nozzle rows for discharging inks other than the white ink are set in the downstream area, ink is first discharged from the nozzle rows existing in the upstream area with respect to the secondary scanning direction (the direction of transport of the recorded medium) and a first layer is formed on the recorded medium which can be observed from the opposite side of the image formed surface. At this time the nozzle rows existing in the upstream area are only for the white ink, and hence the white-color concealing layer is formed as the first layer. Subsequently, the second layer is formed on the first layer from the nozzle rows existing in the downstream area with respect to the secondary scanning direction. At this time, the nozzle rows existing in the upstream area discharge the cyan ink, the magenta ink, the yellow ink, the white ink, and the black ink. In other word, the recorded image (the surface to be observed: the side of the second layer) having the white image as a base can be formed by transporting the recording medium once, and the gray area of the image of the second layer is reproduced by the white ink and the black ink, so that the recorded image has dramatically improved color stability, has a high image quality in which dots are inconspicuous, and is restrained from a phenomenon such that color varies from light source to light source.

The dot forming means of the recording apparatus according to the present invention includes a plurality of rows of nozzle rows in a primary scanning direction, the nozzle rows each including a plurality of nozzles arranged in a secondary scanning direction, and the plurality of nozzle rows arranged in the primary scanning direction are divided into at least two areas so as to constitute an upstream area and a downstream area with respect to the secondary scanning direction, and a first recording mode in which the nozzle rows for discharging the white ink are set in both the upstream area and the downstream area, and the nozzle rows for discharging inks other than the white ink are set in only one of the upstream area and the downstream area, and a second recording mode in which the nozzle rows for discharging the white ink and the nozzle rows for discharging inks other than the white ink are set in both the upstream area and the downstream area are provided (claim 9).

An operation control program of the present invention is an operation control program of a recording apparatus for recording an image using a cyan ink, a magenta ink, a yellow ink, a white ink, and a black ink on a recorded medium, including: a first step for receiving the image data and forming the respective dot pattern data using the various types of inks; a second step for forming respective dots on the recorded medium according to respective dot pattern data obtained in the first step, wherein the first step causes a computer provided in the recording apparatus to form the color of an achromatic area at least with a white dot and a black dot when the image data has the color of the achromatic area having a lightness not lower than a predetermined value and includes a color expressed by forming a cyan dot, a magenta dot, and a yellow dot simultaneously on the basis of subtractive mixture of color stimuli (Claim 10).

According to the configuration described above, only by installing the operation control program on the recording apparatus, since the color in the achromatic area in the image data having a lightness not lower than the predetermined value and being expressed by forming the cyan dot, the magenta dot, and the yellow dot simultaneously on the basis of the subtractive mixture of color stimuli (that is, the color in the gray area) is recorded by replacing at least with the white dot and the black dot, so that the color stability of the image is dramatically improved, a high image quality in which dots are inconspicuous is achieved, and a phenomenon such that color varies from light source to light source can be restrained.

DESCRIPTION OF THE PREFERRED EMBODIMENTS

Figure 1:
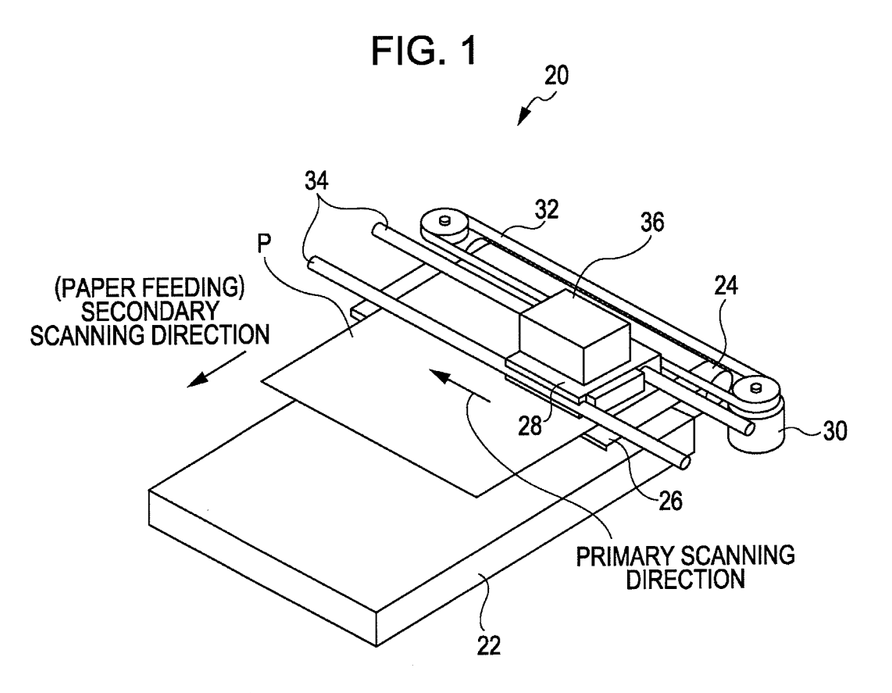
FIG. 1 is a schematic perspective view showing a portion of principal configuration of a printer according to an embodiment.
Figure 2:
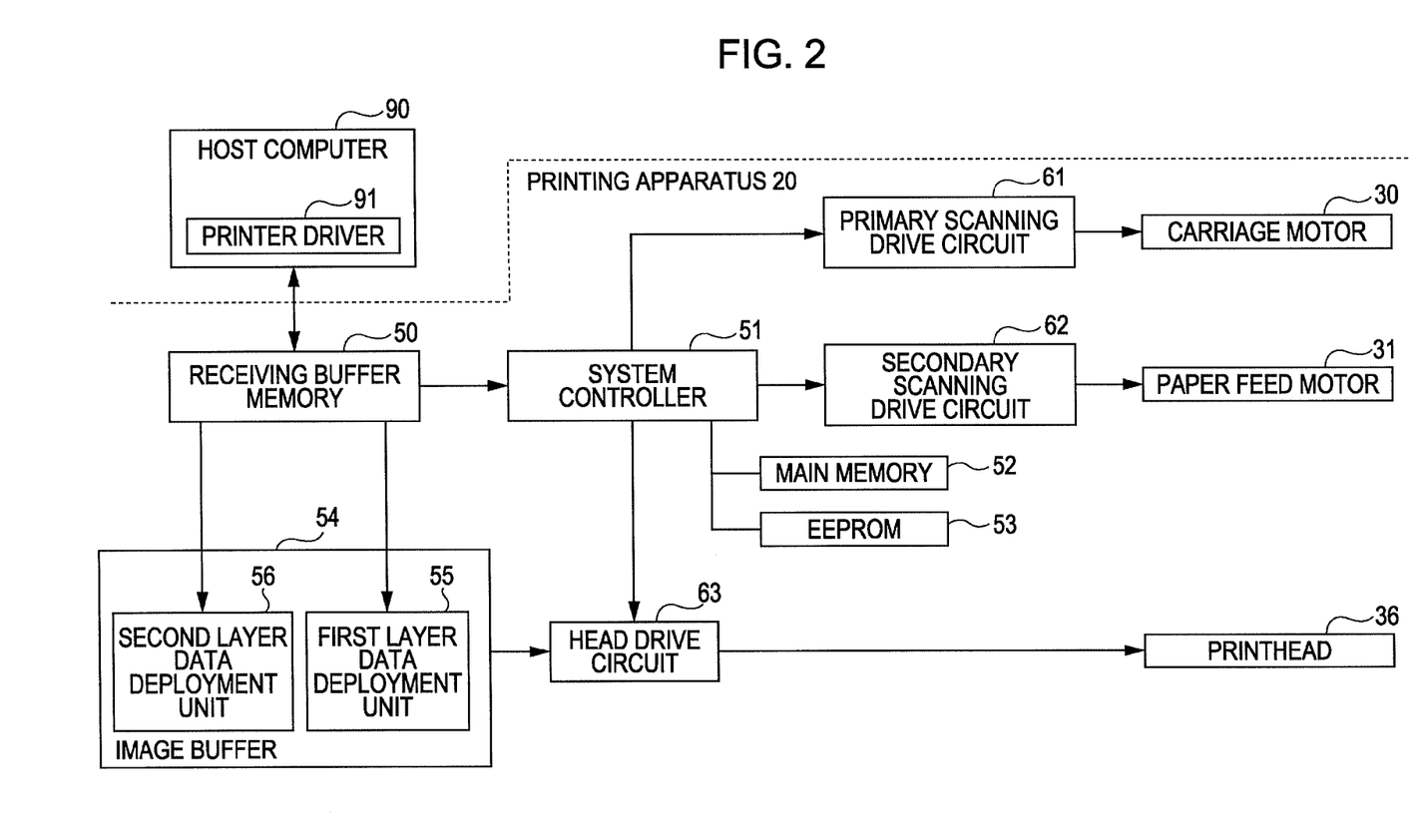
FIG. 2 is a block diagram showing an electrical configuration of the printer shown in FIG. 1.

Referring now to the drawings, a preferred embodiment of a recording apparatus according to the present invention will be described in detail. As the recording apparatus, an ink jet printer (hereinafter, referred to as "printer") will be described as an example. FIG. 1 is a schematic perspective view showing a portion of a principal configuration of the printer in this embodiment, and FIG. 2 is a block diagram showing an electrical configuration of the printer shown in FIG. 1.

A printer 20 shown in FIG. 1 includes a sheet stacker 22, a paper feed roller 24 driven by a step motor, not shown, a platen 26, a carriage 28, a carriage motor 30, a pull belt 32 driven by the carriage motor 30, and a guide rail 34 configured to guide scanning of the carriage 28. Mounted on the carriage 28 is a printhead 36 (recording head) having a plurality of nozzles.

A print sheet P (recording medium) is taken from the sheet stacker 22, wound by the paper feed roller 24, and fed on the surface of the platen 26 in a secondary scanning direction orthogonal to a primary scanning direction of the printhead 36. In this embodiment, the print sheet P is a transparent base material which transmits light such as a transparent film. The carriage 28 is pulled by the pull belt 32 driven by the carriage motor 30, and moves along the guide rail 34 in the primary scanning direction.

The printer 20 includes a receiving buffer memory 50 configured to receive signals supplied from a host computer 90, an image buffer 54 configured to store image data, a system controller 51 (recording control unit) configured to control operation of the entire printer 20, a main memory 52, and an EEPROM 53. By reading a farm ware stored in the EEPROM 53 in the main memory 52 and implementing the same, respective operations of the printer 20 are realized.

The system controller 51 is further connected to a primary scanning drive circuit 61 configured to drive the carriage motor 30, a secondary scanning drive circuit 62 configured to drive a paper feed motor 31, and a head drive circuit 63 configured to drive the printhead 36. The secondary scanning drive circuit 62, the paper feed motor 31, and the paper feed roller 24 constitute a paper feed mechanism. The system controller 51 controls the primary scanning drive circuit 61 and the secondary scanning drive circuit 62 according to various commands included in print data that the receiving buffer memory 50 receives, and set conditions or the like written in the EEPROM 53 in advance.

For example, when it is set to print a high quality image, printing of so-called an interlace system, which prints images while forming raster intermittently in the secondary scanning direction is performed by the primary scanning drive circuit 61 and the secondary scanning drive circuit 62. It is also possible to perform printing of so-called an overlap system by driving nozzles which form one raster at intermittent timings.

Figure 3:
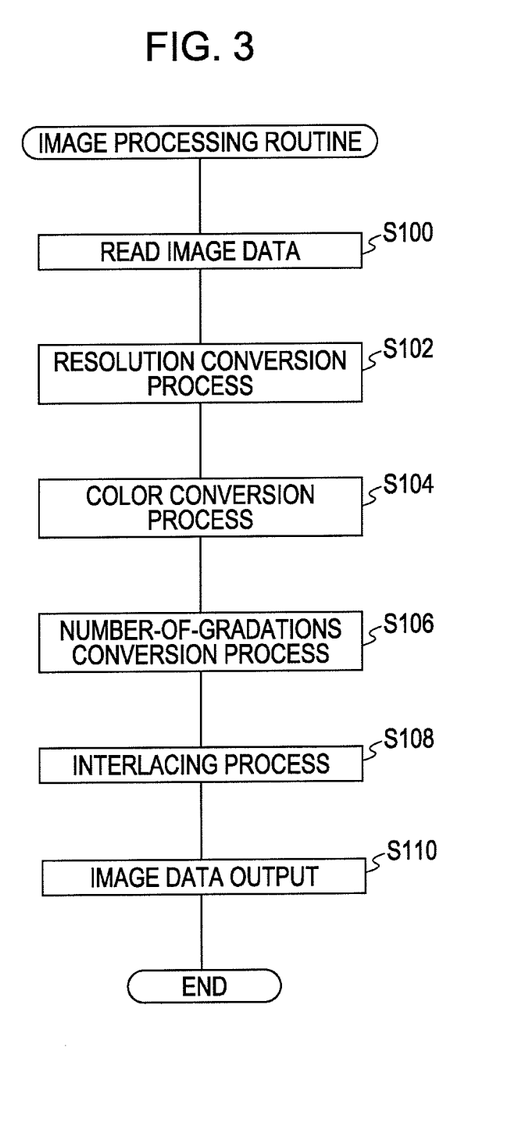
FIG. 3 is a flowchart showing a flow of a process of forming respective dot patterns of respective inks by applying a predetermined image processing on an image data by a printer 20 in this embodiment.

FIG. 3 is a flowchart showing a flow of a process of forming respective dot patterns of respective inks by applying a predetermined image processing on an image data by the printer 20 in this embodiment. This process is started by an operating system of the host computer 90 activating a printer driver 91.

When an image processing routine is started, the printer driver 91 starts reading of the image data to be converted first (Step S100). The data read here is RGB color image data, that is, image data having 256 gradation width from 0 to 255 for each colors R, G, and B.

Subsequently, the resolution of the taken image data is converted into a resolution for the printing by the printer 20 (Step S102). When the resolution of the image data is lower than the print resolution, new data is generated between adjacent image data by performing a linear interpolation. In contrast, when the resolution of the image data is higher than the print resolution, the resolution of the image data is converted into the print resolution by thinning out the data at a constant ratio.

After having converted the resolution, a color conversion process is started (Step S104). The color conversion process is a process to convert RGB image data read precedently into gradation data of the inks of the respective colors provided in the printer. The color conversion process can be performed quickly by referencing a three-dimensional mathematical table which is referred to as a color conversion table.

Figure 4:
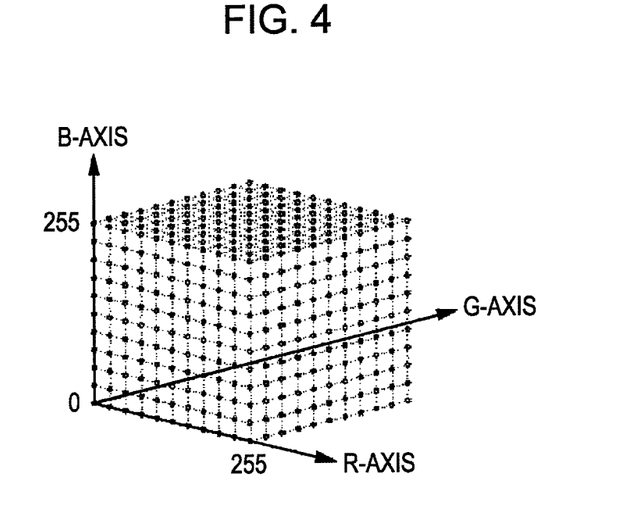
FIG. 4 is an explanatory drawing conceptually showing a color conversion table referenced for a color conversion process.

The color conversion table to be referenced during the color conversion process will be described. FIG. 4 is an explanatory drawing conceptually showing the color conversion table referenced for the color conversion process. The RGB image data is expressed as a coordinate value in a color solid having an R-axis, a G-axis, and a B-axis as orthogonal three axes. In other words, when the color solid is finely comminuted to generate lattice points, it can be said that the respective lattice points represent the RGB image data corresponding to the respective coordinate values. The color conversion table can be considered to be the three-dimensional mathematical table in which image data obtained when the color of the image data presented by the respective lattice points is converted in one to one correspondence with the respective lattice points.

In the respective lattice points of the color conversion table shown in FIG. 4, data corresponding to ink amounts of inks of the respective colors; cyan ink, magenta ink, yellow ink, white ink, and black ink mounted on the printer 20 are stored. When performing the color conversion process in the image processing routine, coordinate points in the color space indicated by the RGB image data to be converted are obtained, and data about the ink amount stored in the lattice points in the periphery thereof is obtained by referencing the color conversion table. By performing an interpolating operation from ink amount data read in this manner, the ink amount data at the coordinate points are calculated. The color conversion of the RGB image data is achieved quickly by calculating the ink amount data at the coordinate points in this manner. In FIG. 4, (R, G, B)=(255, 255, 255) is white, and (R, G, B)=(0, 0, 0) is black. In other words, achromatic colors are formed on the coordinates (R gradation value=G gradation value=B gradation value) are created on a straight line connecting (R, G, B)=(0, 0, 0) and (R, G, B)=(255, 255, 255). The achromatic colors specified at the receptive coordinates on the straight line are expressed by mixing the cyan dots, the magenta dots, and the yellow dots at an equal ratio by the color conversion process or expressed by black ink components different in density in the related art.

In the present invention, portions of the achromatic colors having lightness expressed by forming the cyan dots, the magenta dots, and the yellow dots at the same time not lower than the predetermined value are replaced by white dots and black dots. In other words, the achromatic colors are expressed on a recorded medium with white dots and the black dots. In the case of this embodiment, the achromatic colors having lightness not lower than the predetermined value means achromatic colors having gradation values riot lower than a predetermined value. When the gradation value is zero, the color is expressed only by the black dots, and when it is low gradation value other than zero, since the graininess is inconspicuous, it is advantageous to express only with black dots. When the lightness is expressed by L* in the CIE colorimetric system, the predetermined value is preferably not lower than 15.

Furthermore, this recording method is also applicable to colors close to the achromatic colors, and may be expressed by replacing the color near the achromatic colors expressed by composite of the cyan dots, the magenta dots, and the yellow dots by color dots selected from the cyan dots, the magenta dots, and the yellow dots, the white dots and the black dots. In other words, if the color is bluish gray, it can be replaced by the cyan dots, the white dots and the black dots.

In this embodiment, an ink set including the cyan ink, the magenta ink, or the black ink is exemplified as inks to be mounted on the printer 20. However, the configuration of the ink set applicable in the present invention is not limited thereto and, for example, a light cyan ink, a light magenta ink, or a light black ink having low density may be mounted on this case, lighter achromatic colors expressed by the light cyan dots, the light magenta dots, and the yellow dots may be replaced by the light black dots and the white dots.

As described above, when the color conversion of the RGB image data is performed with reference to the color conversion table, then, a number-of-gradations conversion process is started (Step S106). The number-of-gradations conversion process is a process as described below. The gradation data obtained by the color conversion process is data having 256 gradations from 0 to 255. However, states which can be taken when the gradation data are printed actually are only "to form" or "not to form" dots on a print sheet. Therefore, it is necessary to convert the gradation data having 256 gradations into a two-gradation data corresponding to the presence or absence of dot formation. In this manner, the number-of-gradations conversion process is a process to convert the 256 gradation image data into the two-gradation data indicating "to form" and "not to form" the dots. Although there are various known methods as the method of performing the number-of-gradations conversion process, in this embodiment, a method referred to as error diffusion method is used for performing the number-of-gradations conversion process. Other methods can also be used as a matter of course.

Subsequent to the number-of-gradations conversion process, an interlacing process is performed (Step S108). The interlacing process is a process for sorting image data converted into a form indicating the presence or absence of dot formation in the order to be transferred to the printer 20 while considering the order that the printhead 36 actually forms the dots.

The printer driver outputs image data obtained finally by performing the interlacing process, that is, respective dot pattern data on the basis of the respective inks mounted on the printer 20 as print data to the printer 20 (Step S110). The printer 20 forms the various types of ink dots on the print sheet according to the print data which corresponds to the respective dot pattern data. Consequently, the image corresponding to the image data is printed on the print sheet.

Figure 5:
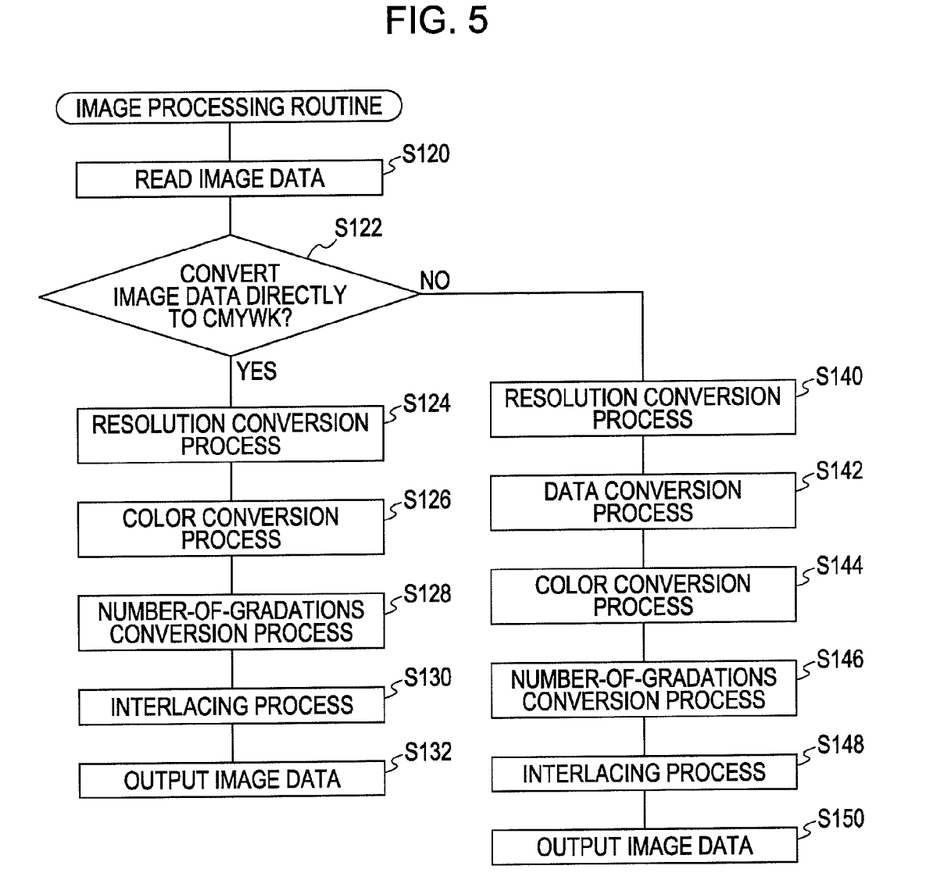
FIG. 5 is another example of a flowchart showing a flow of a process of forming respective dot patterns of respective inks by applying a predetermined image processing on an image data by the printer 20 in this embodiment.

FIG. 5 is a flowchart showing an example of a flow of the process for forming the respective dot patterns of the respective inks in a case where the image data is not the RGB data. The data read here is image data expressed by L*a*b* as one of the CIE colorimetric system. There is a case where the color of the image is corrected for the purpose of printing the image data with desired colors and, in such a case, correction of the color can easily be performed by using image data expressed by L*a*b*. Then, the image data having corrected the color may be used as image data to be read. The image data to be read may be image data expressed by a colorimetric system other than L*a*b*.

First of all, when an image processing routine is started, the printer driver 91 starts reading of the image data to be converted first (Step S120).

Then, the color conversion process for converting read image data directly to data corresponding to the respective inks mounted on the printer 20, that is, the respective inks; the cyan ink, the magenta ink, the yellow ink, the white ink, and the black ink is started, or whether or not the image data is converted into RGB image data once is determined (Step S122).

When starting the color conversion process for converting image data directly to data corresponding to the inks of the respective colors mounted on the printer 20, the resolution of the image data is converted into a resolution for being printed by the printer 20 (Step S124). When the resolution of the image data is lower than the print resolution, new data is generated between adjacent image data by performing the linear interpolation. In contrast, when the resolution of the image data is higher than the print resolution, the resolution of the image data is converted into the print resolution by thinning out the data at a constant ratio.

When the resolution is converted in this manner, the color conversion process is started (Step S126). The color conversion process here is a process to convert L*a*b* image data read precedently into gradation data of the inks in the respective colors provided in the printer. The color conversion process can be performed quickly by referencing the three-dimensional mathematical table which is referred to as the color conversion table.

The color conversion table to be referenced during the color conversion process will be described. The color conversion table is a table in which respective points (input values) on the color space expressed by L*a*b* are related to gradation data (output values) about inks of the respective colors provided in the printer, to which the respective points correspond. Here, the table is formulated in such a manner that if the input values are respective points having L* components not lower than 15, the output values corresponding to the respective points are output values other than zero as gradation data relating to the white ink from among the output values. In contrast, the table is formulated in such a manner that for output values corresponding to respective points having L* components lower than 15 in lightness of the input values, output values corresponding to the respective points are output values of zero as the gradation data relating to the white ink from among the output values. The larger the values of the gradation data relating to the inks in the respective colors, the more the number of dots to be formed in the printer becomes, and if it is zero, the number of dots to be formed is zero.

As described above, when the color conversion of the L*a*b* image data is performed with reference to the color conversion table, then, the number-of-gradations conversion process is started (Step S128). The number-of-gradations conversion process is a process as described below. The gradation data obtained by the color conversion process is data having 256 gradations from 0 to 255. However, states which can be taken when the gradation data are printed actually are only "to form" or "not to form" dots on the print sheet. Therefore, it is necessary to convert the gradation data having 256 gradations into a two-gradation data corresponding to "to form" and "not.to form" the dots. In this manner, the number-of-gradations conversion process is a process to convert the 256 gradation image data into the two-gradation data indicating "to form" and "not to form" the dots. Although there are various known methods as the method of performing the number-of-gradations conversion process, in this embodiment, a method referred to as the error diffusion method is used for performing the number-of-gradations conversion process. Other methods can also be used as a matter of course.

Also, the invention is not limited to the conversion to the two-gradation data, the conversion to three- or more gradation data is also applicable.

Subsequent to the number-of-gradations conversion process, the interlacing process is performed (Step S130). The interlacing process is a process for sorting image data converted into a form indicating the presence or absence of dot formation in the order to be transferred to the printer 20 while considering the order that the printhead 36 actually forms the dots.

The printer driver outputs image data obtained finally by performing the interlacing process, that is, respective dot pattern data on the basis of the respective inks mounted on the printer 20 as print data to the printer 20 (Step S132). The printer 20 forms the various types of ink dots on the print sheet according to the print data which corresponds to the respective dot pattern data. Consequently, the image corresponding to the image data is printed on the print sheet.

In contrast, when converting the taken image data into the RGB image data once, the resolution of the image data is converted into a resolution for the printing by the printer 20 (Step S140). When the resolution of the image data is lower than the print resolution, new data is generated between adjacent image data by performing the linear interpolation. In contrast, when the resolution of the image data is higher than the print resolution, the resolution of the image data is converted into the print resolution by thinning out the data at a constant ratio.

After having converted the resolution, a data conversion process is started (Step S142). The data conversion process here means a step of converting L*a*b* image data read precedently into the RGB image data with reference to a data conversion table. The data conversion process here can be performed quickly by referencing the three-dimensional mathematical table which is referred to as the data conversion table. The data conversion table is a table for converting the L*a*b* image data into the RGB image data, and for converting the image data between these two colorimetric systems.

Steps from Step S146 to S150 performed subsequently are steps similar to the steps from Step S128 to Step S132 described above. The color conversion table to be referenced in Step S146 is different from the color conversion table to be referenced in Step S126 in that the input value is the RGB image data having been subjected to the data conversion process, and is the same as the color conversion table to be referenced in Step S126 in that the output value is the gradation data relating to the inks of the respective colors provided in the printer.

When following YES in Step S122 of the flow, the color conversion table to be referenced in Step S126 is a table for converting the image data of the colorimetric system of the read image data to the gradation data relating to the inks of the respective colors provided in the printer. Here, if the read image data is the image data expressed by a colorimetric system other than the L*a*b*, a color conversion table for converting the image data expressed by the other colorimetric system into the gradation data relating to the inks of the respective colors provided in the printer may be provided separately to reference.

In contrast, when following No in Step S122 of the flow, the data conversion table to be referenced in Step S142 is a data conversion table for converting data from the colorimetric system of the read image data into the RGB image data. Here, if the read image data is the image data expressed by a colorimetric system other than the L*a*b*, a data conversion table for converting the image data expressed by the other colorimetric system into the RGB image data may be provided separately to reference. This data conversion table may be of any type as long as it can convert from the colorimetric system of the input image data to the RGB image data. The color conversion table to be referenced in subsequent Step S146 may be of any type as long as it is a color conversion table for converting from the RGB image data to the gradation data relating to the inks of the respective colors provided in the printer irrespective of the type of the image data read in Step S120, and it is not necessary to provide the color conversion table separately.

The image data converted in this manner is output in the same flow as the flowchart described in FIG. 3 (S144 to S150).

As shown in FIG. 2, the image buffer 54 in this embodiment includes a first layer data deployment unit 55 in which image data to be printed as a first layer (first printed image) on a transparent film P are deployed and a second layer data deployment unit 56 in which image data to be printed as a second layer (second printed image) on the transparent film P are deployed. Image data out of print data that the receiving buffer memory 50 receives are deployed in the first layer data deployment unit 55 and the second layer data deployment unit 56 respectively without being changed. At this time, when the second layer is formed as a white-color concealing layer, concealing data for concealing the first layer are deployed in the second layer data deployment unit 56. The concealing data may be generated by the printer driver 91 of the host computer 90 and transmitted to the printer 20, or may be held in advance in a memorizing means, not shown, on the printer 20 side. The white-color concealing layer as the second layer may be laminated in the same area as the area in which the image is formed in the first layer, or may be laminated in an area other than the area where the image is formed in the first layer. In contrast, the first layer may be formed as the white-color concealing layer and, in this case, the concealing data for concealing the second layer are deployed in the first layer data deployment unit 55.

FIGS. 6(a) and (b) are drawings schematically showing a state in which the printhead 36 scans in the primary scanning direction and the transparent film is transported in the secondary scanning direction. As shown in FIGS. 5(a) and (b), the nozzles of the printhead 36 provided in the printer 20 in this embodiment include a plurality of nozzle rows 44 arranged in the primary scanning direction, each nozzle row 44 having a plurality of nozzles (not shown) arranged in the secondary scanning direction. The nozzle rows are formed for each of the ink color and include a nozzle row 41 for discharging black ink, a nozzle row 42 for discharging white ink, and nozzle rows 43 for discharging color inks other than the white ink and the black ink on the color-to-color basis. Then, the plurality of nozzle rows 44 arranged in the primary scanning direction are divided into two areas so as to constitute upstream areas 45, 45' and downstream areas 46, 46' with respect to the secondary scanning direction.

In FIG. 6(a), the nozzles of the printhead 36 are divided into three groups arranged in sequence in the primary scanning direction (the scanning direction of the printhead), that is, a first nozzle group 41a set only in the upstream area 45, a second nozzle group 42a set on both the upstream area 45 and the downstream area 46, and a third nozzle group 43a set only in the upstream area 45. The first nozzle group 41a is a nozzle group for discharging the black ink, the second nozzle group 42a is a nozzle group for discharging the white ink, and the third nozzle group 46a is a nozzle group for discharging ink other than white and black.

In contrast, in FIG. 6(b), the nozzles of the printhead 36 are divided into three groups arranged in sequence in the primary scanning direction (the scanning direction of the printhead), that is, a first nozzle group 41b set only in the downstream area 46', a second nozzle group 42b set on both the upstream area 45' and the downstream area 46', and a third nozzle group 43b set only in the downstream area 46'. The first nozzle group 41b is a nozzle group for discharging the black ink, the second nozzle group 42b is a nozzle group for discharging the white ink, and the third nozzle group 46b is a nozzle group for discharging ink other than white and black.

The nozzle rows shown in FIGS. 6(a) and (b) can be changed over according to the selection of the image between the first layer and the second layer.

The head drive circuit 63 applies discharge signals to the respective nozzles that the nozzle groups existing in the downstream areas 45, 45' of the printhead 36 on the basis of the image data deployed in the first layer data deployment unit 55, and applies discharge signals to the respective nozzles that the nozzle groups existing in the upstream areas 46, 46' of the printhead 36 on the basis of the image data deployed in the second layer data deployment unit 56.

In FIG. 6(a), first of all, a color image as the first layer is printed on the transparent film P being transported (the paper feeding direction is the secondary scanning direction of the printhead 36) with cyan dots, magenta dots, yellow dots, white dots, and black dots discharged from the nozzle group existing in the upstream area 45 of the printhead 36, then a white-color concealing image as the second layer is formed by white dots from the nozzle group existing in the downstream area 46 of the printhead 36 on the color image.

In contrast, in FIG. 6(b), first of all, a white-color concealing image as the first layer is printed with discharged from the nozzle group existing in the upstream area 45' of the printhead 36, then a color image as the second layer is formed by the cyan dots, the magenta dots, the yellow dots, the white dots, and the black dots discharged from the nozzle group existing in the downstream area 46' of the printhead 36 on the white-color concealing image.

Figure 6:
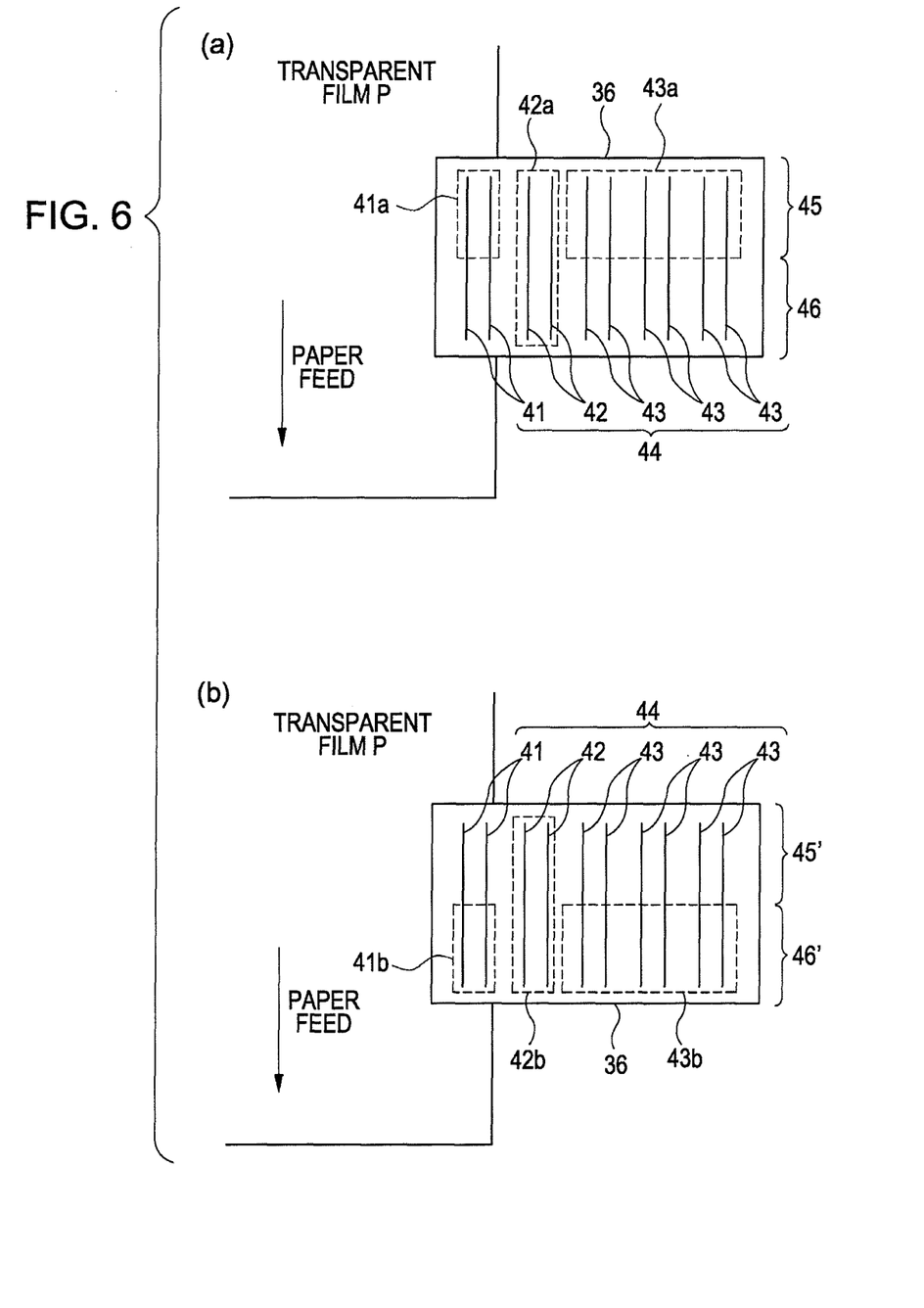
FIG. 6 is a drawing schematically showing a state in which a printhead scans in a primary scanning direction and a transparent film is transported in a secondary scanning direction.
Figure 7:
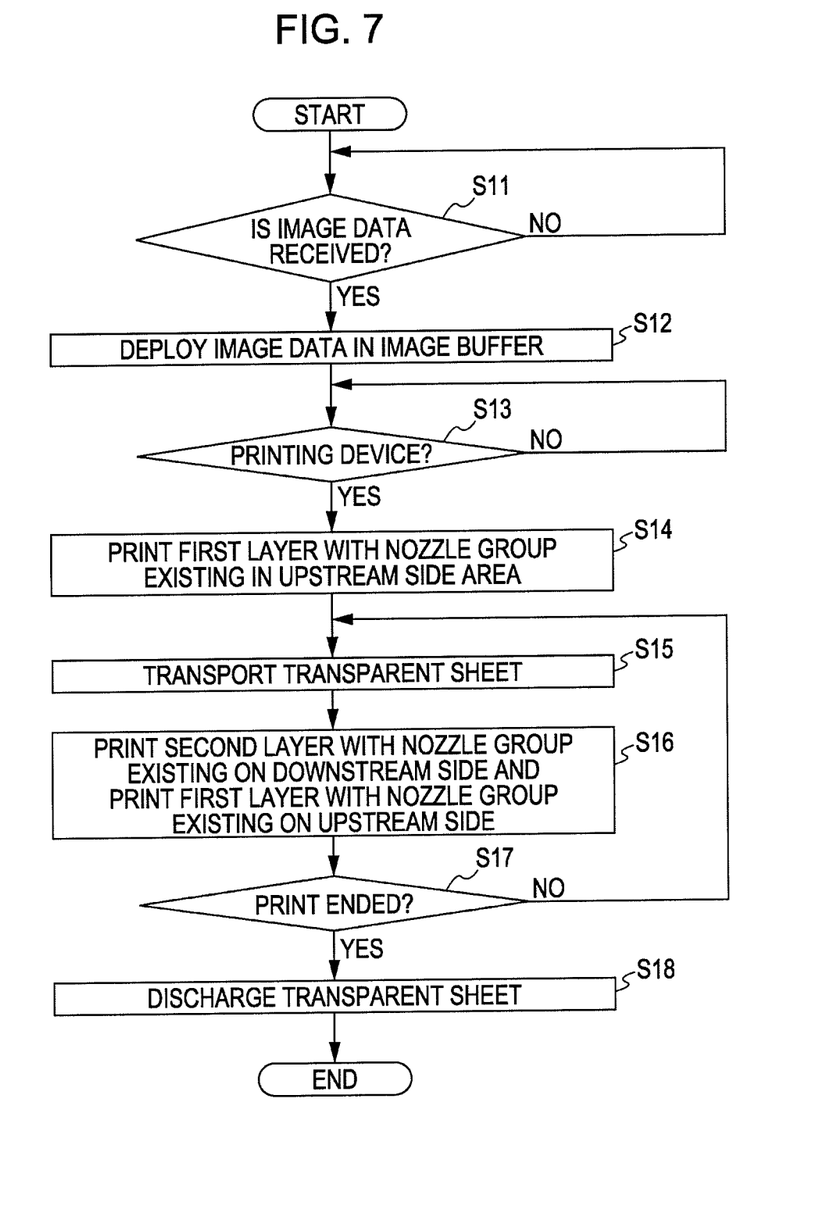
FIG. 7 is a flowchart for explaining a printing method using the printer.

Referring now to FIG. 6 and FIG. 7, a printing method using the printer 20 will be described below. FIG. 7 is a flowchart for explaining the printing method using the printer 20 having the FIG. 6(a) mounted thereon. When print data generated by the printer driver 91 is transmitted from the host computer 90 to the printer 20, the print data is firstly stored in the receiving buffer memory 50 temporarily. The print data is read out in sequence from the receiving buffer memory 50 and, if these are various command data, the system controller 51 analyzes the commands.

If it is the image data formed on the first layer (Step S11: Yes), they are deployed in the image buffer 54. Furthermore, the system controller 51 reads out a white-color concealing image data from the memorizing means, not shown, and deploys the same in the second layer data deployment unit 56 (Step S12: Yes). Here, the white-color concealing image data are data which conceal the image data deployed in the first layer data deployment unit 55 and cover the printable area entirely. In other words, they are data for applying discharge signals to the nozzle group existing in the downstream area 46 of the printhead 36 in FIG. 6(a), and causing the nozzle group existing in such the area to discharge the white ink. The white-color concealing image data do not necessarily have to be data which cover the entire part of the printable area, and may be data which cover the area which is the same as the image data formed on the first layer. In this case, the same data as the image data formed on the first layer are deployed in the second layer data deployment unit 56, the white ink is discharged from the nozzle group existing in the downstream area 46 the printhead 36, and only the corresponding part is concealed.

If there is a printing opportunity (ready for all the printing job) (Step S13: Yes), the system controller 51 drives the secondary scanning drive circuit 62 to activate the paper feed motor 31 to align the transparent film P to a print start position. Then, the system controller 51 further drives the primary scanning drive circuit 61 and the head drive circuit 63 to activate the carriage motor 30 and move the printhead 36 in the primary scanning direction, and causes corresponding nozzles of the nozzle group existing in the upstream area 45 to discharge the black ink, the white ink, the cyan ink, the magenta ink, and the yellow ink on the basis of the image data deployed in the first layer data deployment unit 55 to start printing of a first layer. X1 (Step S14).

Subsequently, the paper feed motor 31 is driven to transport the transparent film by an amount corresponding to the height of the nozzle group (here, approximately half the height of the printhead 36) (Step S15). In other words, the transparent film P is transported to a position where the downstream area 46 of the nozzle group is positioned above the first layer X1. Then, the printhead 36 is moved in the primary scanning direction, and printing of a second layer Y1 is started by discharging the white ink from the corresponding nozzles of the nozzle group existing in the downstream area 45 on the basis of the white-color concealing image data deployed in the second layer data deployment unit 56 to form the white dots on the first layer X1. Simultaneously, a first layer X2 is printed by the upstream area 45 of the nozzle group (Step S16). Although the transparent film is transported only by approximately half the height of the printhead 36 in the above-described steps, the amount of transport may be smaller than that.

If the printing process of the image data deployed in the respective data deployment units 55, 56 is not ended (Step S17: No), the procedure goes back to Step S15, where the paper feed motor 31 is driven again to transport the transparent film by about approximately half the height of the printhead 36. In other words, the transparent film P is transported to a position where the downstream area 46 of the nozzle group is positioned above the first layer X2. Then, the printhead 36 is moved in the primary scanning direction, and printing of a second layer Y2 is started by discharging the white ink from the nozzle group existing in the downstream area 46 on the basis of the white-color concealing image data deployed in the second layer data deployment unit 56 to form the white dots on the first layer X2. Simultaneously, a first layer X3 is printed by the nozzle group existing in the upstream area 45 of the nozzle group (Step S16).

As described above, Step S15 and Step S16 are repeatedly performed and, when the printing process of the image data deployed in the respective data deployment units 55, 56 is ended (Step S17: Yes), a transparent film 21 is discharged to the outside (Step S18).

The printing method of the printer 20 on which FIG. 6(*b*) is mounted is the same as FIG. 6(*a*) other than the data to be deployed between the first layer data deployment unit 55 and the second layer data deployment unit 56 are opposite from FIG. 6(*a*).

Although the print sheet P is a transparent base material which transmits light such as a transparent film in this embodiment, any print sheet P may be employed as long as it is a transmissive recording medium. For example, a translucent recording medium is also applicable.

Also, the arrangement of the nozzles of the printhead in the present invention is not limited to the above-described embodiment, and other arrangements can be employed. In other words, what is essential is that the color ink nozzle group, the white ink nozzle group, and the black nozzle group are arranged in the secondary scanning direction.

The cyan ink, the magenta ink, the yellow ink, and the black ink used in the present invention are not specifically limited, and commercially available inks may be used. The white ink is not specifically limited as well. However, white ink containing metallic oxide (titanium dioxide or the like) (see Japanese Unexamined Patent Application Publication No. 2006-274214, Japanese Unexamined Patent Application Publication No. 2006-307198, and Japanese Unexamined Patent Application Publication No. 2008-239661, etc.) may be used as the white color material, or white ink containing hollow resin particles as the white color material (see U.S. Pat. No. 4,880,465, Japanese Unexamined Patent Application Publication No. 2000-103995, Japanese Unexamined Patent Application Publication No. 2000-239585, and Japanese Unexamined Patent Application Publication No. 2005-154568, etc.) may be used.

Although the example in which the white ink composition is used as the ink which forms the concealing image (primary layer) is exemplified in the embodiment describe above, luminescent ink composition which provides metallic glossiness may be employed instead of the white ink in the present invention. As the luminescent ink, metallic pigment contained ink (Japanese Unexamined Patent Application Publication No. 2007-46034, Japanese Unexamined Patent Application Publication No. 2007-169451, and Japanese Unexamined Patent Application Publication No. 2008-208330, etc.) may be used.

Also, in the embodiment described above, the nozzle rows for discharging the white ink are set in both the upstream area and the downstream area for forming the concealing image (base layer) and recording the color image, and the nozzle rows for discharging inks other than the white ink are set in only one of the upstream area and the downstream area. This is referred to as a first recording mode.

In contrast, it is also possible to perform only recording of the color image without forming the concealing image (base layer). This is referred to as a second recording mode. In the second recording mode, the color image may be recorded by outputting the color image data in the same manner as the first recording mode. In the second recording mode, the white color nozzles for forming the concealing image are not necessary. Therefore, in FIG. 6, in the case of FIG. 6(*a*) for example, a configuration in which the second nozzle group 42*a* is divided into the upstream area 45 and the downstream area 46, the second nozzle group 42*a* existing in the upstream area 45 is set as the nozzles to be used, and the second nozzle group 42*a* existing in the downstream area 46 is set as the nozzles not to be used may also be applicable.

Alternatively, in the second recording mode, it is advised to set both an upstream first nozzle group 41*b* and a downstream first nozzle group 41*b* as nozzles for discharging black ink, set both an upstream third nozzle group 43*b* and a downstream third nozzle group 43*b* as nozzles for discharging color inks, set both the upstream area and the downstream area of the second nozzle group 42 as nozzles for discharging white ink, and use all these for recording color images. In this configuration, the recording speed becomes twice as fast as the first recording mode.

When the printer 20 includes the first recording mode and the second recording mode, selection of the recording mode may be achieved, for example, by the printer driver 91 or the like. When selecting the recording mode, for example, the apparatus may be adapted to select the first recording mode if the recorded medium is a transparent base material and select the second recording mode if it is the opaque base material. However, the recording mode may be selected by other factors other than the type of the medium. Also, the first recording mode may be selected when recording on the recording medium formed of an opaque base material.

REFERENCE NUMERALS

20: printer 22: sheet stacker 24: paper feed roller 26: platen 28: carriage motor 32: pull belt 34: guide rail 36: printhead 41, 42, 43, 44: nozzle row 41a, 41b: first nozzle group 42a, 42b: second nozzle group 43a, 43b: third nozzle group 45, 45': upstream area 46, 46': downstream area 50: receiving buffer memory 51: system controller (printing control unit) 52: main memory 53: EEPROM 54: image buffer 55: first layer data deployment unit 56: second layer data deployment unit 61: primary scanning drive circuit 62: secondary scanning drive circuit 63: head drive circuit 90: host computer 91: printer driver P: print sheet (recorded medium)

The invention claimed is:

1. A recording apparatus for recording an image with a plurality of inks including a cyan ink, a magenta ink, a yellow ink, a white ink containing a white color material, and a black ink on a recorded medium, comprising:

dot pattern data forming means for receiving image data and forming respective dot pattern data with the plurality of inks;

dot forming means for forming respective dots on the recorded medium with the cyan, magenta, yellow, white and black inks according to the respective dot pattern data obtained by the dot pattern data forming means, wherein the dot pattern data forming means includes forming a color of an achromatic area at least with a white dot and a black dot when the image data has color data of the achromatic area having a lightness not lower than a predetermined value and includes a color expressed by forming a cyan dot, a magenta dot, and a yellow dot simultaneously on the basis of subtractive mixture of color stimuli, wherein the dot pattern data forming means comprises means for determining from the image data whether a color of an achromatic area of the image has a lightness lower than a predetermined value and includes a color data expressed by forming a cyan dot, a magenta dot and a yellow dot simultaneously on the basis of subtractive mixture of color stimuli and, if the lightness is lower than the predetermined value, for causing the respective dot pattern data to be formed without the white ink and, if the lightness is not lower than the predetermined value, for causing the respective dot pattern data to be formed with the white ink.

2. A recording method for recording an image with a plurality of inks including a cyan ink, a magenta ink, a yellow ink, a white ink containing a white color material, and a black ink on a recorded medium, comprising:

a first process for receiving image data and forming respective dot pattern data using the plurality of inks; and a second process for forming respective dots on a recorded medium with the cyan, magenta, yellow and white inks according to the respective dot pattern data obtained in the first process, wherein the first process includes forming a color of an achromatic area at least with a white dot and a black dot when the image data has color data of the achromatic area having a lightness not lower than a predetermined value and includes a color data expressed by forming a cyan dot, a magenta dot, and a yellow dot simultaneously on the basis of subtractive mixture of color stimuli, and wherein the first process comprises determining from the image data whether a color data of an achromatic area of the image has a lightness lower than a predetermined value and includes a color data expressed by forming a cyan dot, a magenta dot and a yellow dot simultaneously on the basis of subtractive mixture of color stimuli and, if the lightness is lower than the predetermined value, for causing the respective dot pattern data to be formed without the white ink and, if the lightness is not lower than the predetermined value, for causing the respective dot pattern data to be formed with the white ink.

* * * * *